July 10, 1928.
C. K. GETCHELL
1,676,259
TRUCK RADIUS BAR FOR LOCOMOTIVES
Filed April 27, 1926
-FIG. 1.-
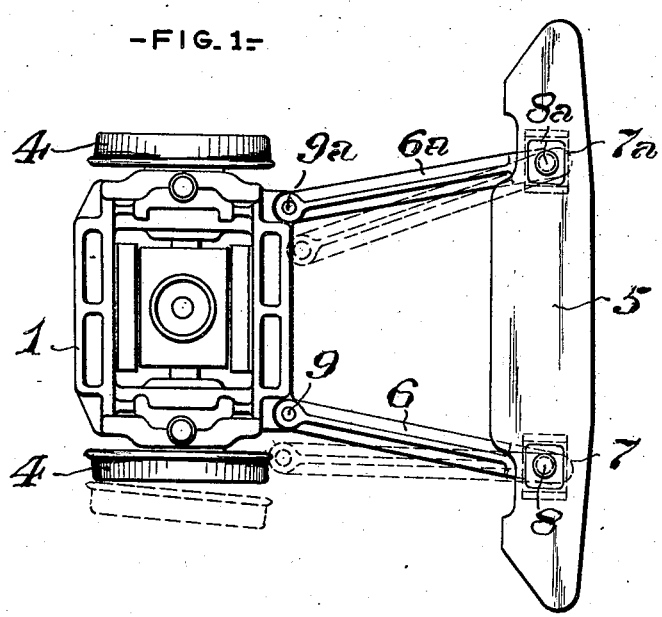
-FIG. 2.-
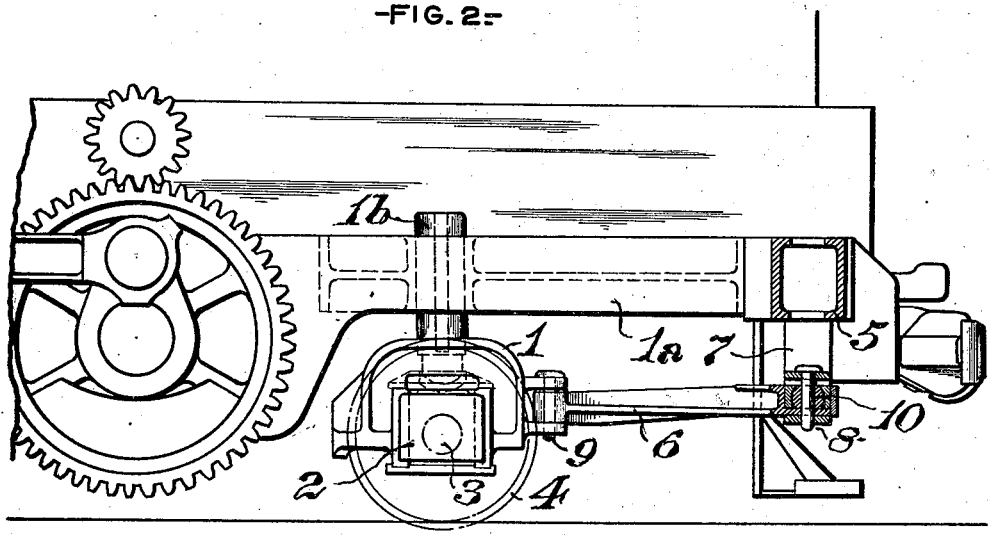
WITNESSES
H. A. Coombs
S. R. Bell
INVENTOR
Charles K. Getchell
by Snowden Bell
Atty.

Patented July 10, 1928.

1,676,259

UNITED STATES PATENT OFFICE.

CHARLES K. GETCHELL, OF SCHENECTADY, NEW YORK.

TRUCK RADIUS BAR FOR LOCOMOTIVES.

Application filed April 27, 1926. Serial No. 104,981.

My invention relates to the guiding trucks of locomotives, and particularly, to means for constraining the lateral movement of radial trucks. The objects of the invention are to provide lateral movement constraining means for trucks, of such construction as will permit the truck to be located more closely to the driving wheel base than is practicable in the case of radius bars of the ordinary type, and to provide a radial construction of such character and location as to be more accessible for inspection, and for detachment when repairs of the truck are required to be made.

The improvement claimed is hereinafter fully set forth.

In the accompanying drawing: Figure 1 is a plan or top view of a locomotive truck, illustrating an embodiment of my invention; and Fig. 2, a side view, partly in vertical section, thereof.

In locomotives, especially those having comparatively long driving wheel bases, it frequently becomes necessary to increase the total wheel base more than is desirable, by locating the truck wheels further away from the front driving wheels, in order to provide sufficient clearance for the ordinary type of radius bar, which is located between the truck and the front driving wheels. In electric locomotives, this clearance is often limited by motor casings. Radial axle boxes are not ordinarily desirable in such cases, particularly to afford the degree of lateral swing of the truck when associated with a long driving wheel base. My invention has been designed to comply with the conditions of service required, and avoid the objections noted.

In the practice of my invention, referring descriptively to the specific embodiment thereof which is herein exemplified as applied in an electric locomotive, the frame, 1, of a two wheeled leading truck, which is located forward of the front driving wheels, carries the journal boxes, 2, of an axle, 3, on the ends of which the wheels, 4, are secured, in the usual manner. The forward end of the locomotive frame, 1$^a$, is secured to the bumper beam, 5, or, in some instances, the locomotive frame is integral with the bumper beam.

The truck frame, 1, is pivotally connected to the locomotive frame, by the centre pin, 1$^b$, and is coupled, adjacent to its ends, to the bumper beam, 5, by radius bars, 6, 6$^a$, the forward ends of which are pivoted to brackets, 7, 7, on the bumper beam, by pins, 8, 8$^a$, and the rear ends are pivoted to the truck frame by pins, 9, 9$^a$. Vertical movement of the centre pin, 1$^b$, is provided for, by spherical bushings, 10, fitted on the pins, 8, 8$^a$ of the radius bars.

In the operation of a truck of the construction substantially as above described, when entering a curved portion of the track, the forward ends of the radius bars, 6, 6$^a$, move about the axial lines of the pins, 8, 8$^a$, and the rear ends move about the axial lines of the pins, 9, 9$^a$, and carry laterally with them, the truck frame, 1, which moves about the axial line of the centre pin, 1$^b$. The truck frame, when moving laterally in either direction, assumes practically the same position, relatively to the locomotive frame, as when a single fulcrum pin, located to the rear of the truck, is applied, as in ordinary practice.

While my invention is herein exemplified in connection with an electric locomotive, it will be obvious that it is equally applicable in steam locomotives of standard types. By reason of its simplicity of construction, and its location relatively to other members of the locomotive structure, it is readily accessible for inspection or detachment when required, and, in its operation, fully complies with the requirements of a leading truck.

I claim as my invention and desire to secure by Letters Patent:

1. In a locomotive, the combination of a locomotive frame; a bumper beam thereon; a wheeled truck frame, movable about a centre pin on the locomotive frame; and radius bars, coupling the ends of the truck frame to the bumper beam.

2. In a locomotive, the combination of a locomotive frame; a bumper beam thereon; a wheeled truck frame; and a pair of radius bars, each having one end pivotally connected to the truck frame, and the other end connected, by a universal joint, to the bumper beam.

CHARLES K. GETCHELL.